June 3, 1958 A. O. FELKNER Re. 24,482

HYDRAULIC STABILIZER FOR CRANES

Original Filed April 17, 1953

INVENTOR.
ALPHIE O. FELKNER
BY Lyon & Lyon
ATTORNEYS

United States Patent Office

Re. 24,482
Reissued June 3, 1958

24,482

HYDRAULIC STABILIZER FOR CRANES

Alphie O. Felkner, Palmdale, Calif., assignor to The Thew Shovel Company, Lorain, Ohio, a corporation of Ohio Original No. 2,740,538, dated April 3, 1956, Serial No. 349,535, April 17, 1953. Application for reissue November 29, 1957, Serial No. 703,472

5 Claims. (Cl. 212—145)

Matter enclosed in heavy brackets [ ] appears in the original patent but forms no part of this reissue specification; matter printed in italics indicates the additions made by reissue.

My invention relates to horizontal stabilizers for cranes, and included in the objects of my invention are:

First, to provide a horizontal stabilizer for cranes of the truck-mounted type which can be readily extended or retracted by remote control, and when retracted does not in any manner interfere with movement of the crane.

Second, to provide a horizontal stabilizer for cranes which incorporates curved stabilizer beams guided in a curved path, thereby providing a construction which inherently involves a minimum number of parts in order to move between a raised, retracted position and a lowered, extended position.

Third, to provide a horizontal stabilizer for cranes which is particularly compact and capable of being readily incorporated in a crane truck chassis.

Other objects and advantages of this invention will be apparent from the following detailed description of a preferred embodiment thereof, as illustrated in the accompanying drawings in which.

Figure 1:
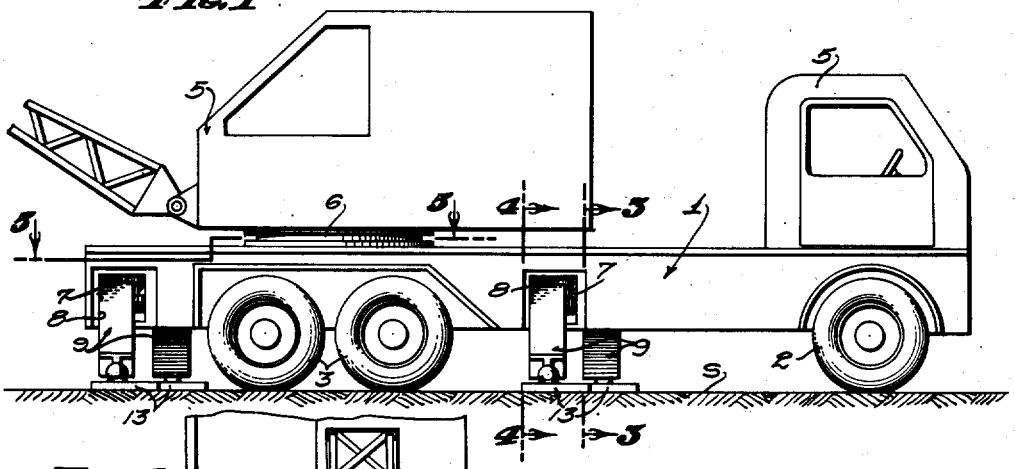
Figure 1 is a substantially diagrammatical side view of a crane equipped with my hydraulic stabilizer.
Figure 2:
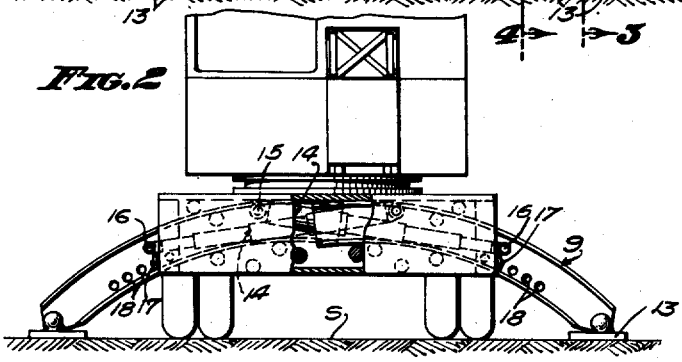
Figure 2 is a rear view thereof with a portion of the truck chassis shown in section.

My stabilizer is adapted to be used in conjunction with a crane which is mounted on a truck chassis 1 having front wheels 2 and dual rear drive wheels 3. The front end of the truck is provided with a truck cab. Supported over the drive wheels of the truck is a crane cab 5, the crane cab being mounted on a journal structure 6 to permit rotation about a vertical axis.

Figure 3:
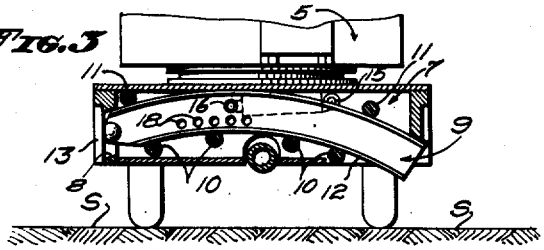
Figure 3 is a sectional view through 3—3 of Figure 1, showing one of the stabilizers in its retracted position.

Formed in the truck chassis forwardly and rearwardly of the drive wheels 3 are pairs of transverse compartments 7, each of which houses a stabilizer unit. Each stabilizer compartment is provided with an opening 8 at one end. The openings of each pair of compartments face laterally in opposite directions. Mounted within each compartment is a stabilizer beam 9 which is arcuate in form. Each stabilizer beam may be formed from an I-beam. Each stabilizer beam is guided in an arcuate path about its center on bottom rollers 10 assisted by one or more top rollers 11. The I-beams occupy substantially the full width of the truck chassis and the rearward lower portions of each compartment may be cut away as indicated by 12 to accommodate the stabilizer beam in its closed position as shown in Figure 3.

Figure 4:
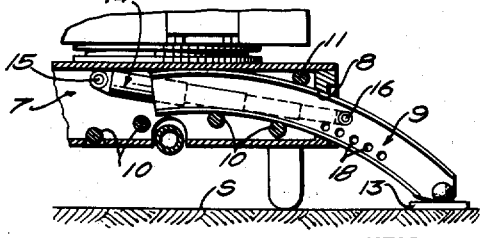
Figure 4 is a similar sectional view taken through 4—4 of Figure 1, showing a stabilizer in its extended position.

The arrangement of the bottom and top rollers 10 and 11 is such that when the stabilizer beam is in its retracted position, its center approximately coincides or is slightly beyond a vertical plane through the longitudinal axis of the truck chassis. As each stabilizer beam moves outwardly through the opening 8 of its stabilizer compartment, the extended end of the stabilizer beam moves in an outwardly and downwardly curving path in order to engage the surface S on which the truck wheels rest at a point laterally outward from the chassis as shown best in Figures 3 and 4.

The extremity of each stabilizer beam is provided with a foot 13 pivotally connected thereto. The foot may be so arranged that when the stabilizer beam is drawn into its retracted position the foot forms a closure for the opening 8 as shown in Figure 3.

Figure 5:
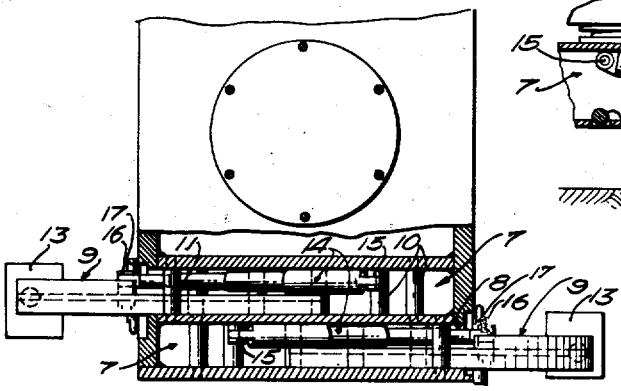
Figure 5 is a fragmentary sectional view taken through 5—5 of Figure 1, showing a pair of stabilizers in their extended position.

Mounted in each compartment along side the corresponding stabilizer beam is a hydraulic cylinder unit 14 which may comprise several telescoping sections. A portion of the flange of the corresponding stabilizer beam may be cut away to accommodate the hydraulic cylinder unit as shown in Figure 5. One end of each hydraulic cylinder unit is pivotally connected by an anchor pin 15 to a wall of the corresponding compartment 7 and the extended end is joined by a connecting pin 16 to the stabilizer beam.

Fluid is pumped into or withdrawn from the hydraulic cylinder units by suitable flow lines and valve means (not shown). When it is desired to extend the two pairs of stabilizer beams, pressure is applied to the hydraulic cylinder units, causing the beams to move outwardly and downwardly until they contact the surface S. The beams are locked in such position by closing the valves which supply fluid to the hydraulic cylinder units; or pins 17 inserted through one of a series of perforations 18 provided in the web of each stabilizer beam may secure the beams in their extended positions.

It will be observed that the extent of travel of the several stabilizer beams is determined by the contour of the ground; that is, the beams move to a lesser or greater extent, depending upon whether or not the surface S is level or irregular. It will be observed that within the limits of travel of the stabilizer beams, the crane may be laterally supported irrespective of the condition of the surface on which the crane is operated.

When the stabilizer beams are extended and in contact with the ground, the bed or chassis of the truck may be rigidly held in a level position so that the off-balance loads imposed by operation of the crane do not cause the truck chassis to tilt. It also will be observed that only in the event of extreme loads would it be possible to tip the chassis and crane even though the crane may be operated in a lateral direction relative to the truck chassis. Without the use of my stabilizers operation of the crane in a lateral direction is very greatly limited to the danger of tipping the truck.

Having fully described my invention, it is to be understood that I do not wish to be limited to the details herein set forth, but my invention is of the full scope of the appended claims.

Other modes of applying the principle of the invention may be employed, change being made as regards the details described, provided the features stated in any of the following claims, or the equivalent of such, be employed.

I therefore particularly point out and distinctly claim as my invention:

1. The combination with a crane mounted on a truck having a chassis and wheels, of a stabilizer comprising: means defining transverse compartments in said chassis frame; an arcuate beam in each compartment; and means guiding each beam about the center of its arc and located in said compartment to direct said beam in an arcuate downward and outward path until its extended end engages the surface on which said truck wheels rest; and a hydraulic cylinder means for extending and retracting each arcuate beam.

2. A stabilizer as set forth in claim 1 wherein: said arcuate beams are arranged in oppositely directed juxtaposed pairs.

3. In a crane stabilizer: a chassis structure; drive wheels supporting the chassis structure; a pair of transverse compartments formed in said chassis structure forwardly and rearwardly of said drive wheels; an arcuate beam in each compartment; means in each compartment for guiding the beams of each pair in laterally opposite directions about their centers to cause the extremities of said beams to contact the surface on which said drive wheels rest; and hydraulic cylinder means in each compartment to extend and retract each arcuate beam.

4. In a crane stabilizer: a chassis structure; drive wheels supporting the chassis structure; a pair of transverse compartments formed in said chassis structure forwardly and rearwardly of said drive wheels; an arcuate beam in each compartment; means in each compartment for guiding the beams of each pair in laterally opposite directions about their centers to cause the extremities of said beams to contact the surface on which said drive wheels rest; hydraulic cylinder means in each compartment to extend and retract each arcuate beam; and a pivotable foot for the extremity of each beam, each foot when its beam is retracted forming a closure for the corresponding compartment.

*5. The combination with a crane mounted on a truck having a chassis and wheels, of a stabilizer comprising: means defining transverse compartments associated with said chassis frame; an arcuate beam in each compartment; and means guiding each beam about the center of its arc and located in said compartment to direct said beam in an arcuate downward and outward path until its extended end engages the surface on which said truck wheels rest; and fluid power means for extending and retracting each arcuate beam.*

References Cited in the file of this patent or the original patent

UNITED STATES PATENTS

| | | |
|---|---|---|
| 2,229,840 | Edwards | Jan. 28, 1941 |
| 2,365,169 | Billings | Dec. 19, 1944 |
| 2,375,264 | Wagner et al. | May 8, 1945 |
| 2,557,484 | Wagner et al. | June 19, 1951 |
| 2,620,811 | Lull | Dec. 16, 1952 |

FOREIGN PATENTS

| | | |
|---|---|---|
| 50,975 | Germany | Feb. 27, 1890 |